(12) United States Patent
Behrens et al.

(10) Patent No.: US 7,413,148 B2
(45) Date of Patent: Aug. 19, 2008

(54) REMOTELY LOCATED CRYOCOOLER

(75) Inventors: John W. Behrens, Torrance, CA (US); Frank O. Chandler, Huntington Beach, CA (US); Jeffrey J. Cronick, Huntington Beach, CA (US); Alfredo Lopez, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 11/398,268

(22) Filed: Apr. 5, 2006

(65) Prior Publication Data
US 2008/0121759 A1 May 29, 2008

Related U.S. Application Data

(63) Continuation-in-part of application No. 11/162,333, filed on Sep. 7, 2005.

(51) Int. Cl.
*B64G 1/64* (2006.01)
(52) U.S. Cl. .................. 244/172.2; 244/172.3; 137/899
(58) Field of Classification Search .............. 244/171.1, 244/172.2, 172.3; 137/207.5, 899
See application file for complete search history.

(56) References Cited

U.S. PATENT DOCUMENTS

| | | | | |
|---|---|---|---|---|
| 5,816,539 A | * | 10/1998 | Chan et al. | 244/159.4 |
| 6,901,955 B2 | * | 6/2005 | Valentian | 137/580 |
| 7,114,682 B1 | * | 10/2006 | Kistler et al. | 244/172.2 |
| 7,240,879 B1 | * | 7/2007 | Cepollina et al. | 244/172.5 |
| 7,270,302 B1 | * | 9/2007 | Wong et al. | 244/171.8 |
| 2007/0193282 A1 | * | 8/2007 | Grayson et al. | 62/45.1 |

* cited by examiner

*Primary Examiner*—J. Woodrow Eldred
(74) *Attorney, Agent, or Firm*—Canady & Lortz LLP; Bradley K. Lortz

(57) ABSTRACT

A cryocooler is located on a spacecraft bus, such as a bus box, separate from the cryogenic propellant tanks disposed on a separable and distinct propellant cartridge system spacecraft docked to the spacecraft bus. In operation, propellant may be continuously pumped from the tanks through the cryocooler cold heat exchanger and then back to the tanks on the separable propellant cartridge system spacecraft through temporarily couplable lines. After the propellant tanks are depleted, the propellant cartridge system is then undocked from the bus and typically discarded. A new propellant cartridge system spacecraft comprising a full set of tanks may then be docked to the bus and the cryocooler supply/return lines coupled. The remote cryocooler may function as part of a larger space depot for spacecraft resupply, although it is not limited to such applications.

22 Claims, 13 Drawing Sheets

REMOTELY LOCATED CRYOCOOLER

CROSS-REFERENCE TO RELATED APPLICATIONS

This continuation-in-part application claims the benefit under 35 U.S.C. §120 of the following co-pending U.S. utility patent application, which is incorporated by reference herein:

U.S. patent application Ser. No. 11/162,333, filed Sep. 7, 2005 by Behrens et al. and entitled "SPACE DEPOT FOR SPACECRAFT RESUPPLY".

BACKGROUND OF THE INVENTION

1. Field of the Invention

The present invention relates generally to spacecraft propellant replacement systems. More particularly, the present invention is related to the propellant cooling system on a spacecraft, such as a lunar or non-earth surface activity module or a crew exploration vehicle.

2. Description of the Related Art

Systems and devices used in space flight and exploration, such as non-Earth surface activity modules and other spacecraft, are continuously being researched and developed for various purposes. Surface activity modules, such as a lunar surface activity module, are filled with propellant on earth and then launched into space to perform a predetermined mission. Upon completion of the mission, the modules are left in space or returned back to earth for analysis, parts, and/or for updating and reuse.

Current surface activity modules and spacecraft that require propellant to perform certain tasks, such as flight control, flight translation or orientation through use of thrusters, or other propellant requiring tasks, are performance limited and restricted due to the limited amount of propellant available onboard. As such, many spacecraft are incapable of performing extended missions or missions that require a substantial amount of propellant consumption over a short duration of time.

In addition, there are vehicle weight and size restrictions and limitations, as well as significant costs associated with the launching of a vehicle, which are directly related to the amount of propellant that the vehicle is carrying onboard. The more propellant a vehicle is carrying, generally, the heavier the vehicle, the larger the vehicle, and the more propellant required and the higher the costs associated with the launch of that vehicle. Moreover, there are overall limitations upon which the launching of such a vehicle becomes impractical or infeasible.

Cryocoolers are used to maintain stored cryogenic propellant at a proper temperature present a particular problem in spacecraft design. Conventional cryocoolers are integrated into propellant tank cooling systems disposed proximate to the tank, typically located as close as possible to the thermal load. This arrangement conveniently ensures a secure thermal interface between the cooler and thermal load that maximizes cooling performance. Such cryocooler systems may also support long term (e.g. five or more years) on-orbit storage of cryogenic propellants. During resupply operations the cryocooler is discarded along with the empty propellant tanks. However, this approach is expensive because space qualified cryocoolers have higher development and manufacturing costs than the cryogenic propellant tanks they are designed to cool.

In view of the foregoing, there is a need for a cryocooler systems and methods that provide a cost effective propellant storage solution for spacecraft, particularly for long duration missions. Further, there is a need for such systems and methods for extended and repeated space flight explorations. There is also a need for such systems and methods to support space flight missions that require a significant amount of propellant.

SUMMARY OF THE INVENTION

Embodiments of the invention involve separation of the cryocooler from the tanks of propellant it is tasked with cooling. As taught herein, a remotely located cryocooler provides adequate cryogenic cooling without modifying existing propellant tanks. In addition, this configuration defines a common interface between propellant tanks in a propellant cartridge system and cryocooler. Accordingly, embodiments of the invention reduce the development costs of new propellant tank sets.

In addition, by locating the cryocooler within the spacecraft bus, distributed systems such as power and thermal radiators are readily available. This approach simplifies cryocooler integration into the propellant tank thermal control system and eliminates development and manufacturing costs of a new propellant tank module that would otherwise be required to provide portable power and sufficient radiator area. A remotely located cryocooler preserves advanced cryocooler equipment and other expensive spacecraft components not discarded along with empty propellant tanks in the propellant cartridge system.

A typical embodiment of the invention comprises a cryocooler disposed on a spacecraft bus for cooling propellant and feed and return lines for carrying the propellant to and from the spacecraft bus. The feed and return lines are temporarily couplable to a propellant cartridge system through an interface and the propellant cartridge system stores the propellant. In an exemplary embodiment, the spacecraft bus may comprise a space depot for spacecraft resupply. Notably, the propellant cartridge system may be disposable. Further, the spacecraft bus may be configured for manned or unmanned operation.

In further embodiments, the propellant may comprise a fuel and an oxidizer and the propellant cartridge system comprises separate tanks for the fuel and for the oxidizer. In addition, one or more temperature sensors may be disposed on the propellant cartridge system and coupled to a propellant monitoring and temperature control system for the cryocooler.

The cryocooler may comprises a helium working fluid to cool the propellant. In addition, the cryocooler may employ a plurality of cooling interfaces (cooling stages) to cool the propellant. Further, the propellant may comprise a fuel and oxidizer such that each of the plurality of cooling interfaces separately cools the fuel and the oxidizer. In a similar manner, the cryocooler may comprise a plurality of heat rejecting sinks to remove heat from the propellant from the spacecraft bus.

A typical method embodiment of the invention comprise storing propellant on a propellant cartridge system, feeding propellant from the propellant cartridge system to a spacecraft bus through a feed line and a temporarily couplable interface, cooling the propellant with a cryocooler disposed on the spacecraft bus, and returning the propellant from the spacecraft bus to the propellant cartridge system through a return line and the temporarily couplable interface. The method may further include sensing a temperature of the propellant with one or more temperature sensors disposed on the propellant cartridge system and controlling the cryocooler in response to the sensed temperature of the propellant.

Method embodiments of the invention may be further modified consistent with the apparatuses and systems described herein. The various embodiments of the present invention provide several advantages.

For example, embodiments of the present invention provide the advantage of a cost effective propellant storage solution for spacecraft, particularly for long duration missions. Embodiments of the invention are advantageous for missions requiring significant amounts of propellant, particularly those where propellant resupply is planned. Similarly, embodiments of the invention are advantageous for extended and repeated space flight explorations.

Yet another advantage provided by an embodiment of the present invention is the provision of an exchangeable propellant cartridge system for an in-space propellant depot. This allows an orbital propellant depot to remain in orbit while only replacing the propellant cartridges associated therewith. Thus, the present invention provides an efficient and inexpensive technique for supplying propellant to a spacecraft in space. The present invention provides relatively low cost propellant tanks that are self-contained and may be replaceable or self-disposing.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1:
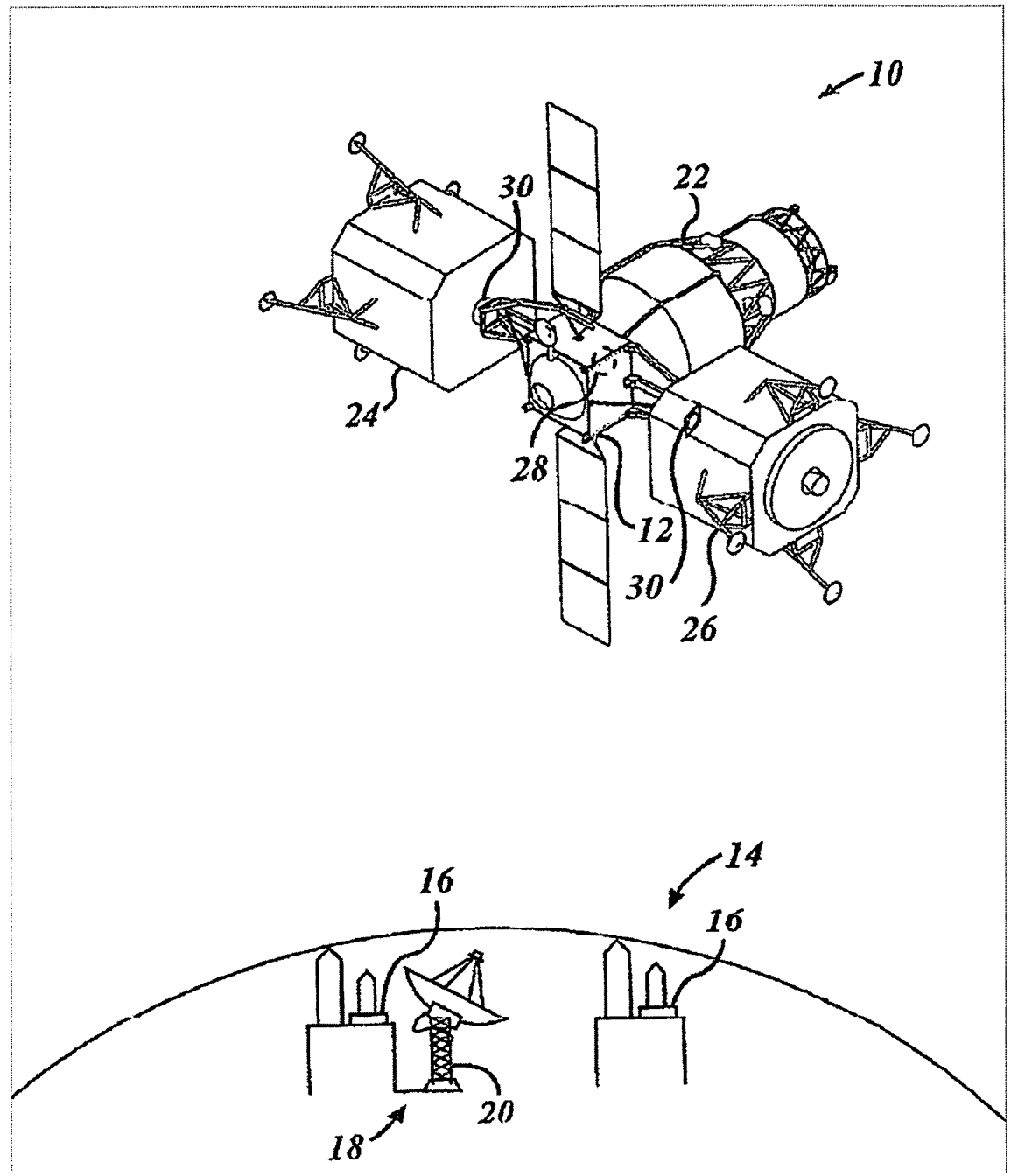
FIG. 1 is a perspective view of a terrestrial system incorporating an orbital propellant depot in accordance with an embodiment of the present invention.

The cryocooler may be located in a standard spacecraft bus (such as a spacecraft bus box) along with other standard spacecraft elements known in the art (e.g. communications, power generation and distribution, navigation, data handling, thermal management, etc). The cryogenic propellant tanks may then comprise a separable and distinct propellant cartridge system docked to the spacecraft bus containing the cryocooler. Insulated lines run from the cryogenic tanks to the cooling interface (or cold heat exchanger) of the cryocooler. In operation, propellant (e.g. fuel and/or oxidizer) may be continuously pumped from the tanks through the cryocooler cold heat exchanger and then back to the tanks on the separable propellant cartridge system spacecraft. After the propellant tanks are depleted, the cryocooler may be switched off and supply/return lines disconnected. The propellant cartridge system is then undocked from the bus (and typically discarded). A new propellant cartridge system comprising a set of tanks full of propellant may then be docked to the bus and the cryocooler supply/return lines reconnected. The cryocooler is then switched back on to begin cooling the cryogenic propellant in this new tank set. As described hereafter, a remote cryocooler embodiment of the present invention may function as part of a larger space depot for spacecraft resupply, although it is not limited to such an application.

2. Space Depot for Spacecraft Resupply

In order to support a space exploration program that includes multiple mission architecture, the associated spacecraft thereof must be supplied with propellant between missions or trips. For example, in order for a lunar surface activity module to perform multiple trips between a moon surface and an orbit around the moon or earth, the module needs to be resupplied with propellant. This propellant resupply may be performed at various locations, some of which including a lunar orbit, the earth-moon L1 node, an earth orbit, or elsewhere in space. The present invention provides propellant resupply crafts that allow for the supplying of propellant to spacecraft at the stated locations, the propellant supply crafts and methods are described in greater detail below. Also, a variety of other embodiments are contemplated having different combinations of the below described features of the present invention, having features other than those described herein, or even lacking one or more of those features. As such, it is understood that the invention can be carried out in various other suitable modes.

In each of the following Figures, the same reference numerals are used to refer to the same components. While the present invention is described with respect the propellant resupply of spacecraft, the present invention may be adapted for various applications and systems including: land-based vehicle systems, or other applications or systems known in the art that require servicing of a vehicle.

In the following description, various operating parameters and components are described for one constructed embodiment. These specific parameters and components are included as examples and are not meant to be limiting.

Referring now to FIG. 1, a perspective view of a terrestrial system incorporating an orbital propellant depot 10 in accordance with an embodiment of the present invention is shown. The terrestrial system includes ground-based systems 14 and one or more orbital propellant depots, only one is shown, specifically the propellant depot 10. The ground-based systems 14 include launch platforms 16 for the orbital propellant depots, as well as for surface activity modules, crew exploration vehicles, exchangeable propellant cartridge systems, and other spacecraft, some of which are described below. The ground-based systems 14 may include a control or communication system 18 for communication control of the various spacecraft before, during, and after launching of the spacecraft. Of course, signals received from the ground-based systems 14 may be transmitted directly from the ground-based systems 14 or indirectly through various antenna, transponders, satellites, space stations, or other communication medium known in the art. A ground-based antenna tower 20 is shown.

The propellant depots 10, in general, are launched from earth to be placed in space and are used for supplying propellant to spacecraft in space. The propellant depots may also be used as a safe harbor for crewmembers, as will become more apparent in view of the following description. Spacecraft may dock to the propellant depots, refill their propellant tanks, and then continue performing mission tasks. The mission tasks may be performed in space, in an earth orbit, in a lunar orbit, on the moon, or elsewhere in space.

The propellant depots may orbit the earth, the moon, or other planetary or non-planetary bodies. In one example embodiment, the propellant depots are located at the L1 node or the point in space where gravity pull from the earth and the moon are approximately equal. At this node, the propellant depots 10 orbit the earth at the same rate as the moon.

The utility box 12 is coupled to an exchangeable propellant cartridge system 22 and to a first spacecraft and to a second spacecraft, which are represented by boxes 24 and 26, respectively. The spacecrafts 24 and 26 may be in the form of surface activity modules, crew exploration vehicles, and/or other spacecrafts known in the art. The utility box 12 is coupled to the cartridge system 22 via a propellant cartridge adaptor 28 and to the spacecrafts 24 and 26 via spacecraft adaptors 30. The spacecrafts 24 and 26 may dock to the propellant depot 10 for refueling or for performing other servicing needs.

Although the present invention is primarily described with the propellant resupply of spacecraft, the propellant depots may be utilized and/or modified to supply various other services. Also, although the present invention is primarily described with the docking of propellant cartridge systems containing spacecraft propellant, other systems may be docked containing other services, support fluids, and equipment.

In general, the more expensive, difficult to design and integrate hardware is located onboard the utility box 12. The low cost propellant tanks are self-contained and are located on the cartridge system 22. This reduces operating costs and propellant replacement costs associated with having an orbital propellant depot.

Figure 2:
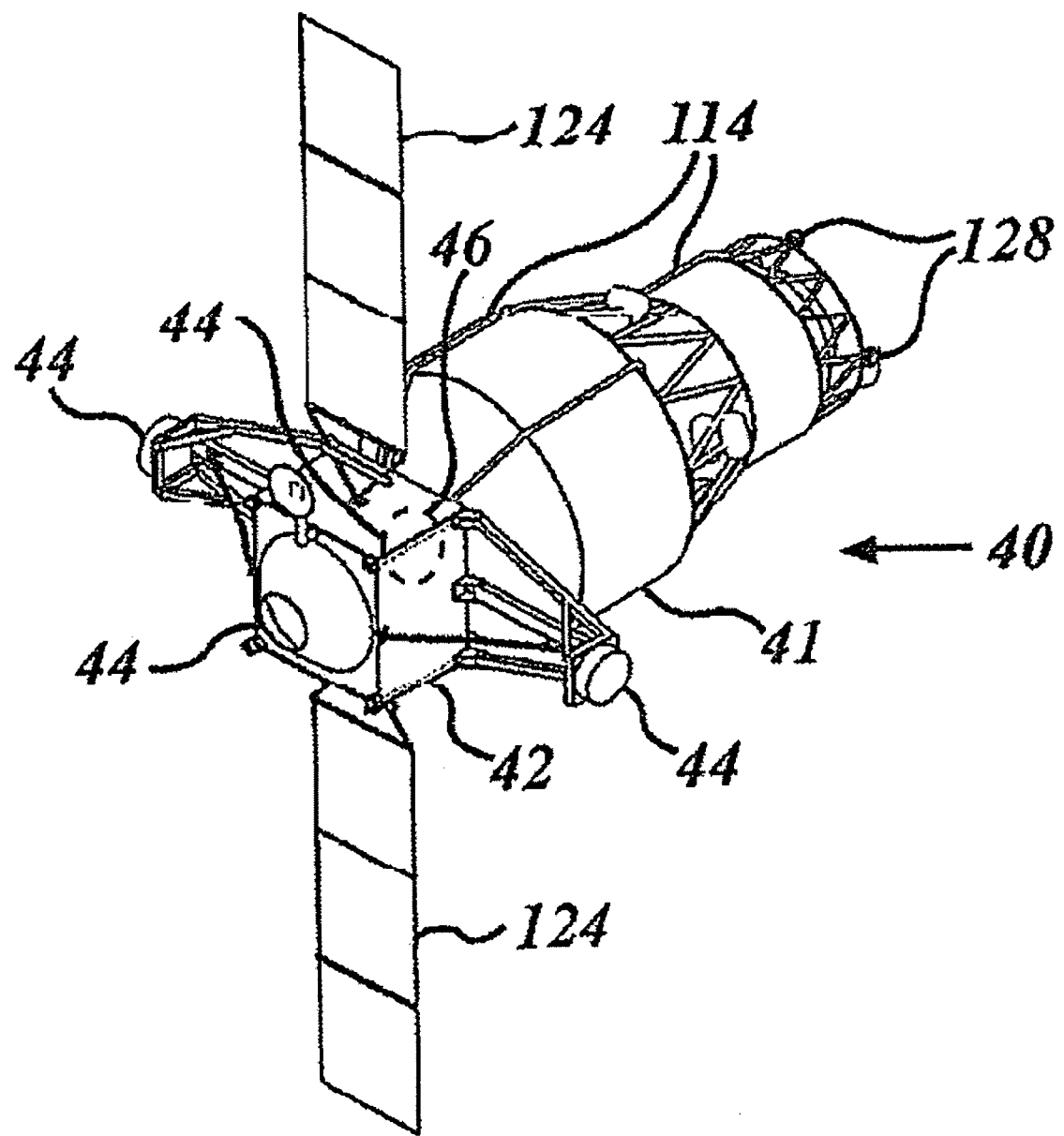
FIG. 2 is a perspective view of an unmanned orbital propellant depot in accordance with an embodiment of the present invention.
Figure 3:
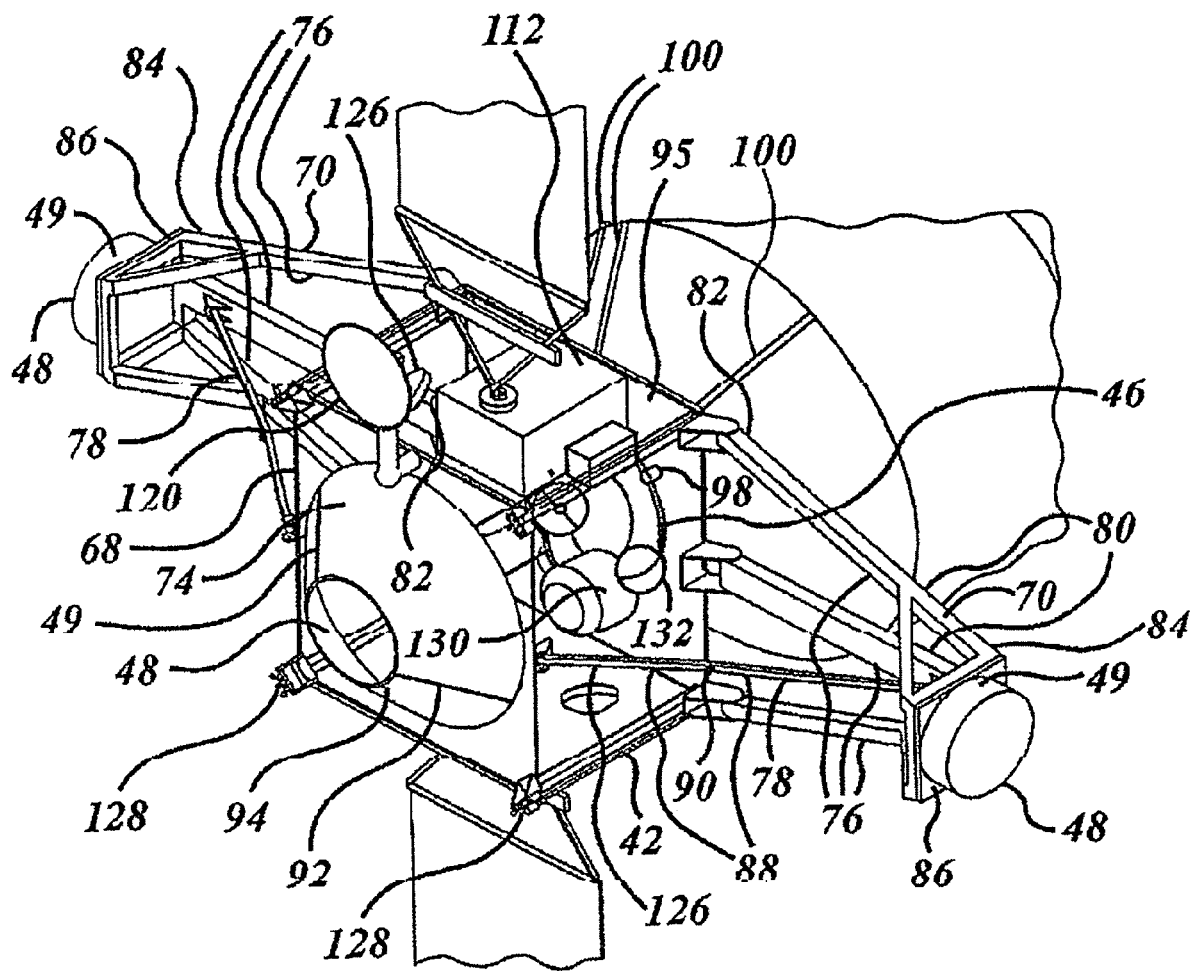
FIG. 3 is a close-up perspective view of a utility box of the unmanned orbital propellant depot of FIG. 2.
Figure 4:
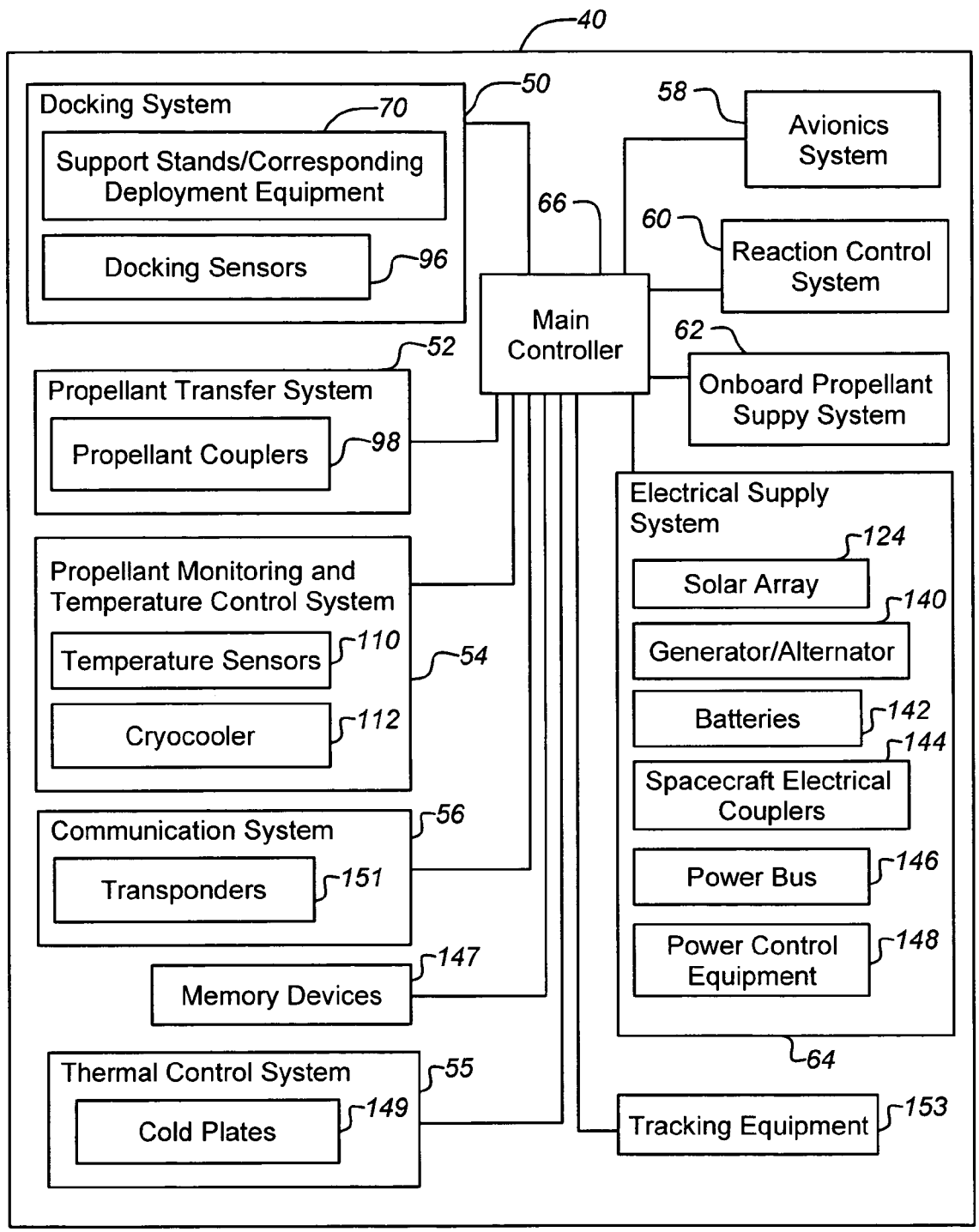
FIG. 4 is a block-diagrammatic view of the orbital propellant depot of FIG. 2.

Referring now to FIGS. 2-4, block diagrammatic and perspective views of an unmanned orbital propellant depot 40, comprising of a utility box 42 with an exchangeable propellant cartridge system 41 attached thereto in accordance with an embodiment of the present invention, are shown. The utility box 42 is a spacecraft in and of itself. The unmanned depot 40 contains various space flight equipment, some of which is shown in FIGS. 2-4. The utility box 42 includes multiple docking ports 44. As an example, the utility box 42 may include one or more propellant cartridge system docking ports 46 (only one is shown) and one or more spacecraft docking ports 48. The spacecraft docking ports have associated spacecraft couplers 49. The spacecraft couplers 49 may be designated as standby (passive) docking couplers or active docking couplers depending upon whether the associated spacecraft is actively receiving propellant.

The unmanned propellant depot 40 also includes multiple operating systems including: a docking system 50, a propellant transfer system 52, a propellant monitoring and temperature control system 54, a thermal control system 55, a communication system 56, an avionics system 58, a reaction control system 60, an onboard propellant supply system 62, an electrical supply system 64, and other systems known in the art that may be utilized during flight of a spacecraft. All of the stated systems may include their own designated controller and/or may share a common controller, such as the main controller 66.

The docking system 50 includes the utility box 42, which has a main body 68 and multiple docking port support stands 70. The main body 68, as shown and in general, is a housing that contains or has coupled thereto the various components of flight equipment. Although the support stands 70 are shown in tripod style, they may be of various types and styles. Each of the support stands 70 includes multiple support legs 76 and a deployment member 78. The support legs 76 may be in the form of trays and contain propellant lines 80 that extend to and from the cartridge system 41. The support legs 78 have a pivoting end 82 that is coupled to the main body 68 and a fixed end 84 that is coupled to docking platforms 86. The docking platforms 86 are coupled to spacecraft active/passive couplers 48. The deployment member 78 has a pair of arms 88 that fold at a center point 90. The deployment members 78 allow the support stands 70 to deploy away from and retract towards the main body 68. The support stands 70 may be deployed and retracted via one or more motors (not shown), linkages (not shown), and the controller 66. A conical shaped coupler 74 is also coupled to the main body 68 and includes a base 92 and a docking port 94. The base 92 is coupled directly to the main body 68.

The docking system 50 also includes the cartridge docking ports 46, which couple to the docking adaptor 95 of the cartridge system 41. The cartridge docking coupler 95 may also be active or passive. The cartridge docking ports 46 are coupled to the utility box 42 and provide an attachment for connecting to the cartridge system 41.

The docking system 50 may also include docking sensors 96. The docking sensors 96 may be used to assure that the cartridge system 41 and any spacecraft docked to the unmanned depot 40 are properly coupled to the utility box 42 prior to propellant transfer. The docking sensors 96 may be of various types and styles. The docking sensors 96 may be in the form of contact sensors, infrared sensors, resistive sensors, or other similar sensors known in the art.

The propellant transfer system 52 includes the controller 66 that controls the transfer of propellant from and within the cartridge system 41 to a spacecraft docked at one of the docking ports 48. Propellant couplers 98 within the cartridge docking ports 46 and the cartridge-docking adaptor 95 are coupled to cartridge propellant supply and return lines 100. Propellant transfers through the cartridge propellant lines 100, through the cartridge docking ports 46 and cartridge-docking adaptor 95, through the propellant lines 80, and through the spacecraft docking ports 48 to the docked spacecraft.

The propellant monitoring system 54 may be referred to as a cryogenic propellant thermal management system. The propellant monitoring system 54 includes temperature sensors 110, which may be located on the unmanned depot 40 and coupled to the propellant lines 80 or may be located directly on the propellant cartridge system 41. The controller 66 is coupled to the temperature sensors 110 and adjusts the temperature of the propellant within the cartridge system 41 using a cryocooler 112 and/or other cooling devices or systems. The supply and return lines 100 extend between the propellant tanks 114 on the cartridge system 41 and the cartridge docking adaptor 95, whereupon they are coupled to the cryocooler 112.

The thermal control system 55 provides the utility box 42 with the systems to control the temperatures of the subsystem hardware located within the utility box 42. The thermal control system 55 as embodied, may include coldplates 149, which may be located on the unmanned depot 40 and coupled to the communication system 56, the avionics system 58 and the electrical power supply system 64. The coldplates 149 of the thermal control system 55 are coupled to a heat rejection system as typically found and utilized in the art.

The communication system 56 includes the controller 66, a communication antenna 120, and other communication equipment known in the art. The communication antenna 120, in one example embodiment, is a high gain antenna. The communication system 56 may be in communication with the cartridge system 41, with a ground-based system 14, and or with other spacecraft.

The avionics system 58 and the reaction control system 60 may include the communication system 56 and any other avionic or flight operation systems and devices known in the art. The avionics system 58 and the reaction control system 60 may include equipment typically found on a spacecraft with regards to flight operations, navigation, communication, etc. The avionics system 58 and the reaction control system 60 may include sun tracking solar arrays 124, reaction wheels 126, and thrusters 128, as shown. The thrusters 128 are used for flight and orientation of the unmanned depot 40.

The onboard propellant supply system 62 includes the controller 66 and may include an onboard propellant/hydrazine tank 130, a helium tank 132, and other propellant related tanks known in the art. The helium tank 132 may be used to pressurize the hydrazine tank 130. The onboard propellant supply system 62 provides propellant for flight by the unmanned depot 40. The onboard propellant supply system 62 supplies propellant to the thrusters 128, which are controlled by the avionics system 58 and the controller 66. The propellant tanks are pressurized and thus propellant contained therein is transferred through the use of valves (not shown).

The electrical supply system 64 includes the controller 66, a generator/alternator 140, batteries 142, solar arrays 124 and various electrical connections, lines, and couplers between the utility box 42 and any docked spacecraft, designated as spacecraft electrical couplers 144. Upon docking of a spacecraft to the unmanned depot 40, electrical connections are made between the spacecraft and the electrical supply system 64. Electrical connectors, such as a portion of the electrical couplers 144, within the docking couplers 49 are attached to the spacecraft. Electrical power is supplied from a power bus 146 that is coupled to the generator/alternator 140 and/or the batteries 142 to the spacecraft. The controller 66 monitors and adjusts the supply of electrical power. Electrical supply lines (not shown) may be extended through the legs 76, similar to the propellant lines 80.

The main controller 66 may be microprocessor based such as a computer having a central processing unit, memory (RAM and/or ROM), and associated input and output buses. The main controller 66 may be an application-specific integrated circuit or may be formed of other logic devices known in the art. The main controller 66 may be a portion of a central vehicle main control unit, an interactive vehicle dynamics module, a control circuit having a power supply, combined into a single integrated controller, or may be a stand-alone controller as shown.

The utility box 42 and the above-identified systems contained therein may include additional housings (not shown) for other standard bus box sub systems that are normally found on a spacecraft bus. The utility box 42 may include memory or data storage devices 147, power control boxes and equipment 148, cold plates 149, transponders 151, various tracking equipment 153, and other flight equipment, some of which may be part of one or more of the above-stated systems, as shown. The utility box 42 includes standard satellite bus functions, such as communication, power generation and distribution, and command and data handling.

Note that the utility box 42 operates independently of the cartridge system 41. The utility box 42 is capable of operating, performing flight tasks, and performing other spacecraft tasks separately from the cartridge system 41. This allows for change out or replacement of the cartridge system 41 without the use of additional devices.

Figure 5:
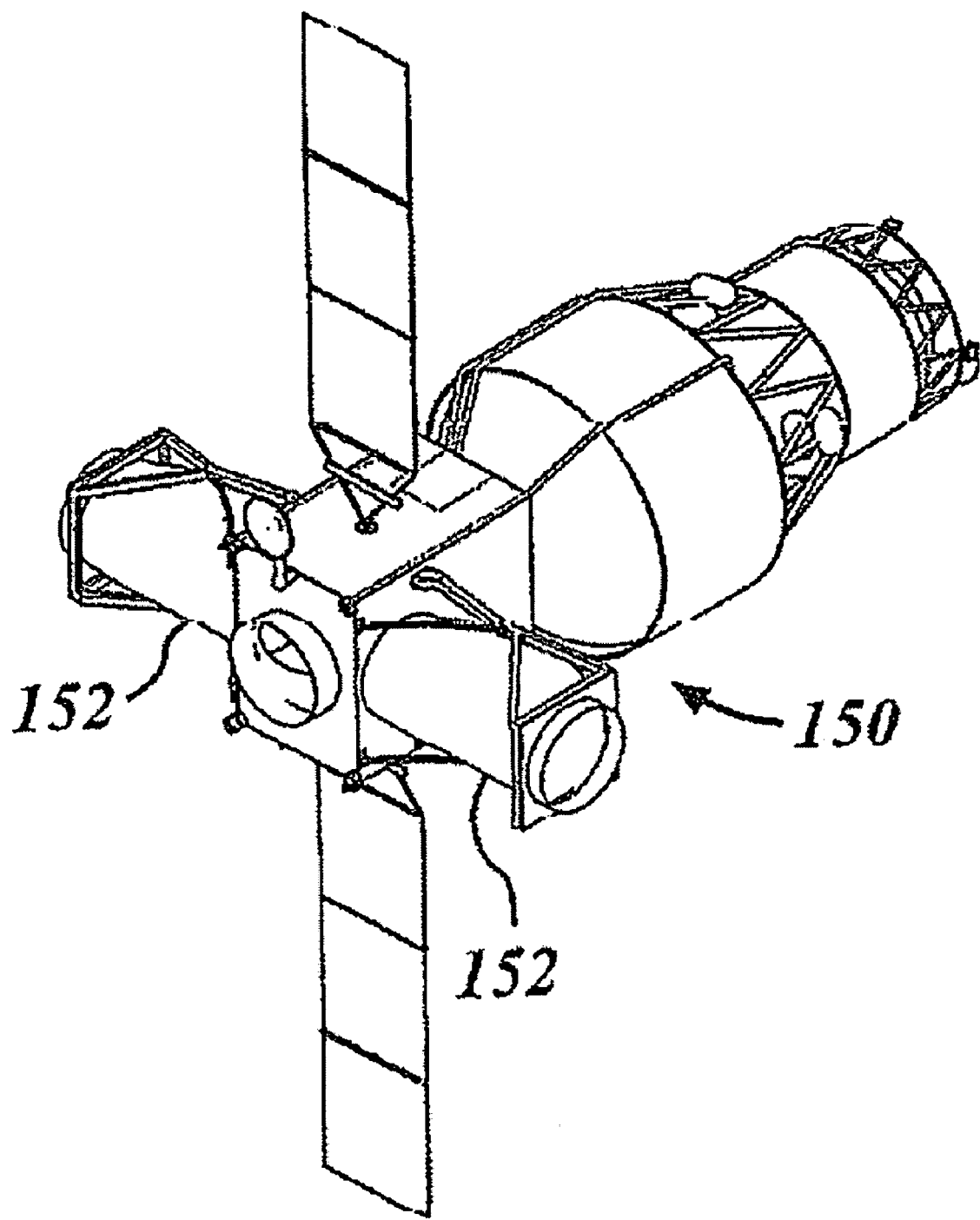
FIG. 5 is a perspective view of an orbital propellant depot that is capable of being manned in accordance with another embodiment of the present invention.
Figure 6:
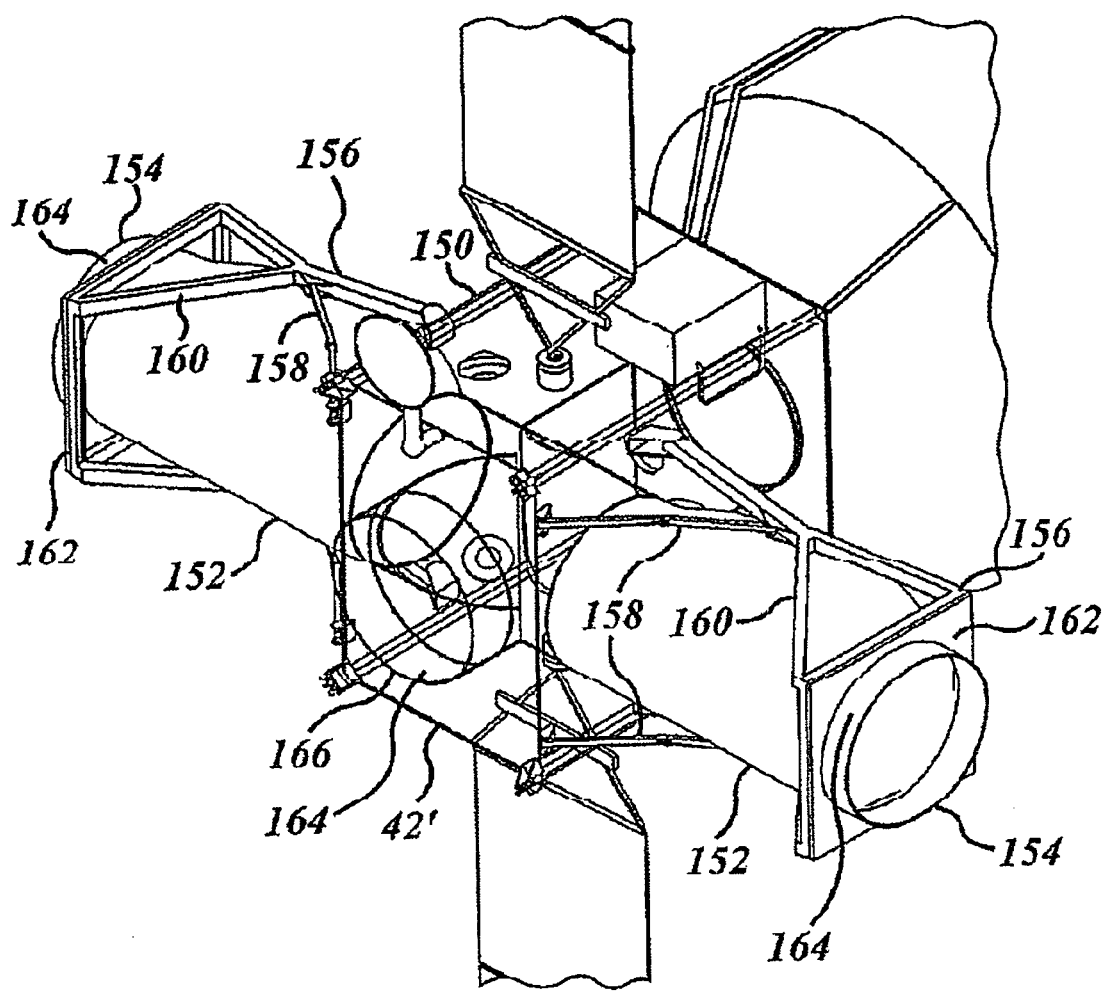
FIG. 6 is a close-up perspective view of a utility box of the orbital propellant depot of FIG. 5.

Referring now to FIGS. 5 and 6, perspective views of an orbital propellant depot 150 that is capable of being manned in accordance with another embodiment of the present invention is shown. The propellant depot 150 is similar to the propellant depot 40, but is modified for manned operation and carrying capability. The propellant depot 150 may be configured for both unmanned and manned operation. The propellant depot 150 includes the above-stated flight equipment and devices of the propellant depot 40, as well as man rated transfer tunnels 152 and other life support systems and equipment. The tunnels 152 provide safe transfer and passage of crewmembers between a docked spacecraft and a utility box 42' of the propellant depot 150. The tunnels 152 may be pressurized or unpressurized.

Although a pair of man rated transfer tunnels are shown, any number of tunnels may be utilized. The tunnels 152 span between a pair of docking ports 154 and the utility box 42'. The tunnels 152 are held in place by support stands 156. The tunnels 152 and the support stands 156 may be collapsible. The tunnels 152 may be formed of a flexible material, be formed of telescoping sections, or have an "accordion-like" structure to allow for the collapsing or retracting thereof. The support stands 156 may have dual folding members 158, as shown, or have other structure to allow for the collapsing or retracting thereof. The tunnels 152 and support stands 156 may have various configurations, only a few of which are described herein and illustrated in FIGS. 5 and 6. The support stands 156, as shown, have a pair of main 'Y'-shaped support members 160 that are coupled to docking port platforms 162. Docking port couplers 164 reside on the platforms 162 and are coupled to the tunnels 152 therethrough.

The propellant depot 150 may also include life support systems, such as oxygen tanks, breathing apparatuses, cavity pressure adjustment devices, lavatories, and food and beverage supplies and storage centers, which are not shown for simplicity, and other life support systems commonly found on a man rated spacecraft. The utility box 42' may have crew sitting/waiting areas, crew rest areas, or other accommodations, all of which are not shown, but may be envisioned by one skilled in the art.

The utility box 42' shown has a cylindrical style-docking adaptor 166, as opposed to the conical shaped docking adaptor 74. As stated above, the utility boxes may have various style docking adaptors. The cylindrical style-docking adaptor 166 may lend itself better for manned operation and crew transfer.

Figure 7:
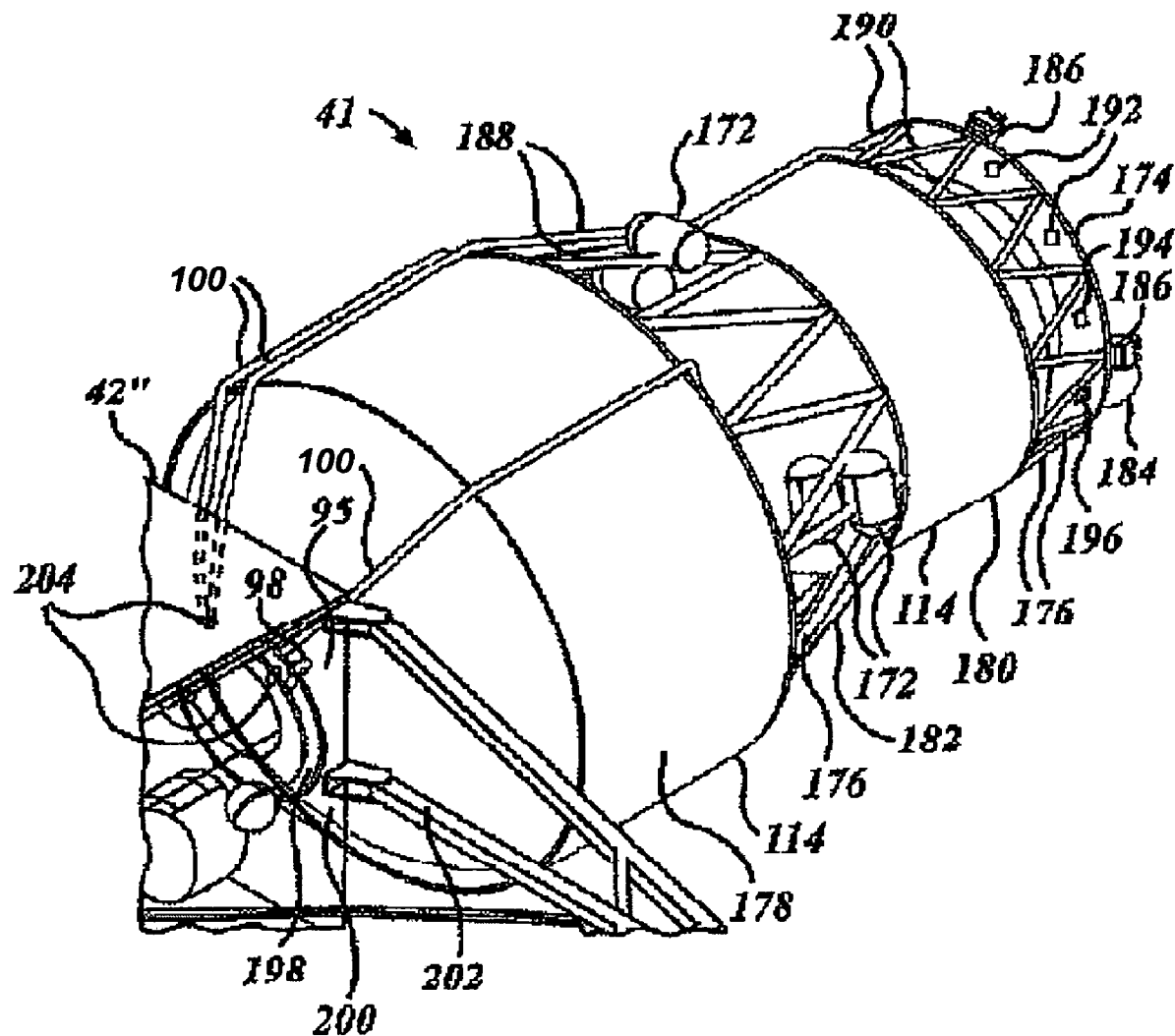
FIG. 7 is a close-up perspective view of a propellant tank cartridge system in accordance with an embodiment of the present invention.

Referring now to FIG. 7, a close-up perspective view of the propellant tank cartridge system 41 in accordance with an embodiment of the present invention is shown. The cartridge system 41 includes the propellant tanks 114, pressurant tanks or bottles 172, and an avionics support system or shelf 174. The propellant tanks 114, the bottles 172, and the avionics shelf 174 are separated by cross-support members 176 that extend therebetween. The propellant tanks 114 include a main cryogenic fuel tank 178 and an oxidizer tank 180 that are coupled to each other via an interstage 182 having a portion of the cross-support members 176. The cartridge system 41 is also a spacecraft in and of itself and is self-supportive. The avionics shelf 174 includes flight equipment necessary for flight operation and docking to a utility box, such as one of the utility boxes 42 or 42'.

The hydrazine tank 184 contains propellant for cartridge system 41 flight, as opposed to the main fuel tank 178 and the main oxidizer tank 180, which are storage tanks containing propellant that is transferred to spacecraft through a utility box of a propellant depot. Propellant within the hydrazine tank 184 is supplied to thrusters 186 of the cartridge system 41. The thrusters 186 may receive propellant directly from the main fuel tank 178 and the main oxidizer tank 180, thereby eliminating the need for the hydrazine tank 184. The thrusters 186 are used for in space flight maneuvering of the cartridge system 41.

The bottles 172 may contain pressurized helium, which is used to pressurize the propellant tanks 114. The bottles 172, as shown, are coupled to a first set of cross-members 188 extending between the main tank 178 and the oxidizer tank 180.

The avionics shelf 174 is coupled to the oxidizer tank 180 via a second set of cross-members 190. The avionics shelf 174 includes communication devices 192 for communication with a propellant depot and a ground-based station. The avionics shelf 174 may also include navigation control software and hardware 194 for flight operation, as well as disposal electronics 196 for disposal of the cartridge system 41. The cartridge system 41 may be remotely guided by a propellant depot or a ground-based station.

The cartridge system 41 also includes the orbital propellant depot docking adaptor 95 coupled to the main fuel tank 178. The docking adaptor 95 has a cylindrically shaped portion 198 and a conical shaped portion 200 and is attached to a leading end 202 of the main tank 178. The adaptor 95 includes propellant line couplings 204 for connecting the propellant lines 100 on the cartridge system 41 with propellant lines 100 on a utility box 42". Oxidizer feed and return lines 100 and propellant tank feed and return lines 100 for the cartridge system 41 are shown. The adaptor 95 also includes coupling sensors, such as the sensors 98, mentioned above.

Figure 8:
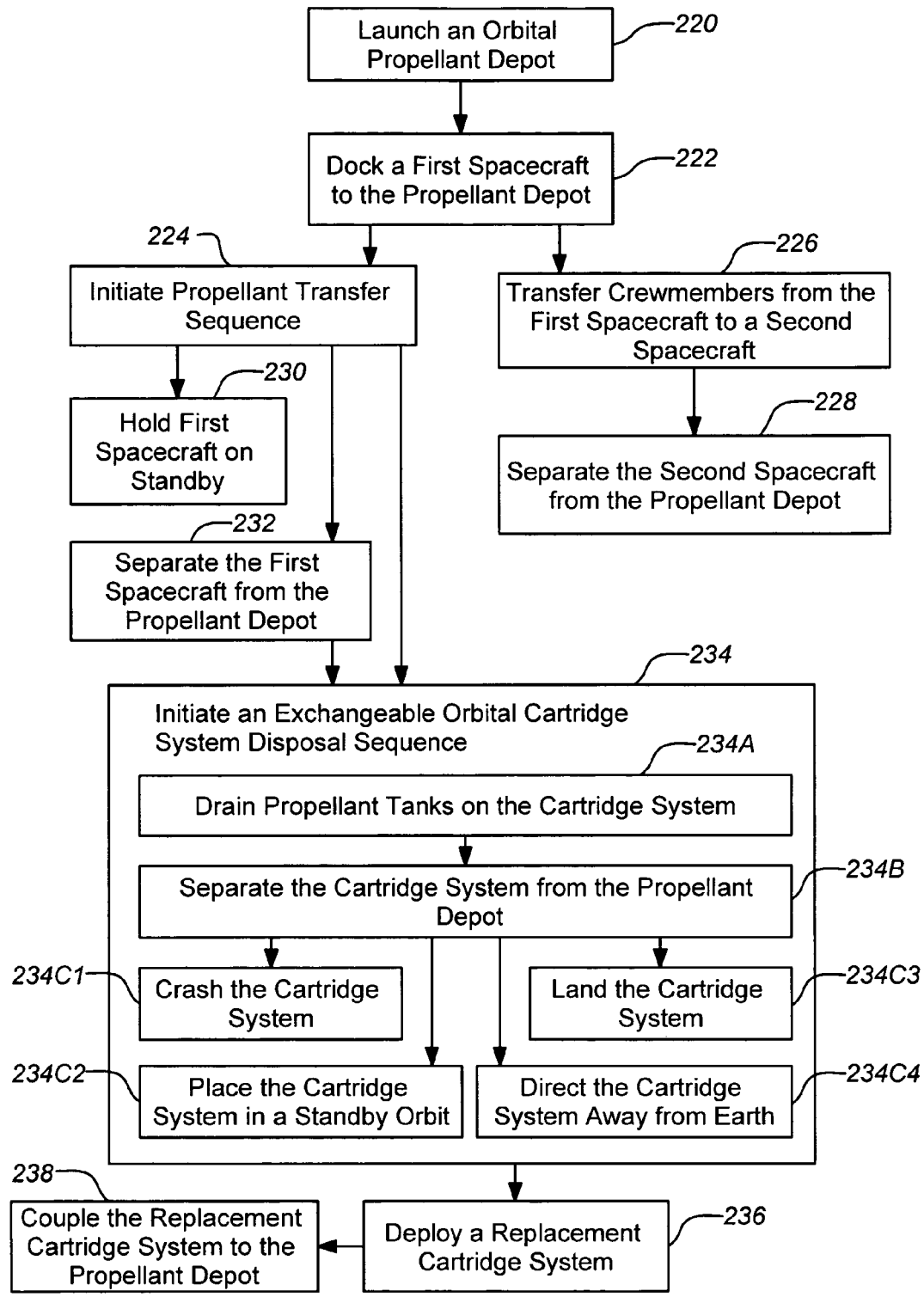
FIG. 8 is a logic flow diagram illustrating a method of providing propellant to a spacecraft in space in accordance with an embodiment of the present invention.

Referring now to FIG. 8, a logic flow diagram illustrating a method of providing propellant to a spacecraft in space in accordance with an embodiment of the present invention is shown.

In step 220, an orbital propellant depot, such as one of the propellant depots 40 or 150, is launched into space. The propellant depot may be launched using conventional methods of launching a spacecraft into space. The propellant depot may have associated rockets and propellant tanks for such launch or may be carried on a vehicle that has such equipment necessary to reach earth orbit flight or beyond. The propellant depot may be launched with an initial exchangeable propellant cartridge system, such as the cartridge system 41, attached thereto.

In step 222, a first spacecraft is docked to the propellant depot in space. The first spacecraft may be a surface activity module, a crew exploration vehicle, or other spacecraft. Once the first spacecraft is in range of the propellant depot, the first spacecraft may be guided to mate with the propellant depot via the avionics onboard the propellant depot and/or the avionics onboard the first spacecraft. As an example, the first spacecraft may have tracking equipment or sensors, such as the tracking equipment 153, for tracking and detecting targets on the propellant depot or vice versa. The sensors may include a laser range finder, an infrared camera, a visible spectrum camera, or other target tracking sensors. The targets may be of various types and styles and may include existing hardware or structure of the first spacecraft or the propellant depot. The first spacecraft is coupled to one of the docking ports of the propellant depot, such as one of the ports 44, 154, or 166. Propellant transfer lines and electrical lines may be connected upon coupling of the first spacecraft to the propellant depot.

In step 224, the propellant transfer sequence is initiated for the transfer of propellant from the propellant cartridge, such as cartridge 41, through the utility box 42 or 42' of the propellant depot to the first spacecraft.

In step 226, when the propellant depot is capable of transferring crewmembers, such as the propellant depot 150, the crewmembers of the first spacecraft may be transferred over to a second spacecraft through the utility box, such as utility box 42'. The second spacecraft may have been launched with the propellant depot or may have been previously docked and supplied propellant by the propellant depot.

In step 228, the second spacecraft may be separated from the propellant depot to perform assigned mission tasks.

In step 230, upon completion of supplying propellant to the first spacecraft, the first spacecraft may be held on standby until an assigned crew arrives or other mission parameters are met. In step 232, upon completion of the propellant resupply of the first spacecraft, the first spacecraft may, when having unmanned flight capability or when an assigned crew has arrived, be separated from the propellant spacecraft to perform assigned mission tasks.

In step 234, when propellant within the cartridge system is depleted or below a predetermined level, the cartridge system disposal sequence is initiated. In step 234A, when the propellant tanks within the cartridge system are not fully depleted of propellant, they may be drained prior to disposal of the cartridge system. In step 234B, the cartridge system is separated from the propellant depot and is removed from the orbit in which the propellant depot is within.

In step 234C1, the cartridge system is crashed into a planetary surface, a moon surface, or other celestial surface or body. In step 234C3, the cartridge system is landed on a celestial body. For example, the cartridge system may be directed towards earth and when at an appropriate altitude may deploy parachutes to decelerate its descent. In step 234C2, the cartridge system is directed into a standby or resting orbit. The standby orbit is different from the orbit of the propellant depot. The cartridge system may remain in the standby orbit indefinitely. In step 234C4, the cartridge system is directed farther into space away from earth. Of course, other techniques not discussed herein may be used to dispose of the cartridge system.

In step 236, a replacement exchangeable propellant cartridge system is deployed. The replacement cartridge system is launched into space to mate with the utility box. The replacement cartridge system may also have associated launch rockets and propellant tank or other launch equipment needed for placing the replacement cartridge system in orbit. The replacement cartridge system is directed to an area nearby the utility box, such as an area surrounding the L1 node. Once in orbit, the thrusters of the replacement cartridge system may be used to maneuver the replacement cartridge system to mate with the utility box. The utility box of the propellant depot may alone be used to guide in the replacement cartridge system via communication between avionics or controllers located on the utility box and the replacement cartridge system.

The replacement cartridge system may be guided to mate with the utility box using the avionics located onboard the replacement cartridge system, avionics onboard the utility box, and/or via commands generated from the ground-based station. The replacement cartridge system may also have sensors for detecting targets on the utility box or vice versa. The sensors may also include a laser range finder, an infrared camera, a visible spectrum camera, or other target tracking sensors. The targets may be of various types and styles and may include existing hardware or structure of the replacement cartridge system or the utility box.

In step 238, the replacement cartridge system is coupled to the utility box via a propellant depot adaptor, such as adaptors 46 and 95.

The above-described steps are also meant to be illustrative examples; the steps may be performed sequentially, synchronously, simultaneously, or in a different order depending upon the application.

The present invention provides an orbital propellant resupply base that may remain at, for example, the L1 node for an unlimited period of time. The propellant resupply base allows for in space replacement of propellant through the use of exchangeable and disposable propellant cartridges. As such, the propellant resupply base operating costs are minimized.

3. Remotely Located Cryocooler

As illustrated in the examples systems shown in FIGS. 1-8, further embodiments of the invention are focused on the separation of the cryocooler 112 from propellant cartridge system 22, 41 through a couplable interface (e.g. propellant couplers 98) including feed and return lines 100 to conduct propellant between the tanks and the cryocooler 112. See, e.g. FIG. 3. The cryocooler 112 is disposed in a separate spacecraft, e.g. such as the various forms of a utility box 12, 42 described in the foregoing description of a space depot for spacecraft resupply, although embodiments of the invention are not limited to resupply depot applications. Accordingly, a propellant tank cartridge system as used in this application encompasses any type of separable spacecraft including propellant tanks which are temporarily coupled to a spacecraft included a remote cryocooler.

Figure 9A:
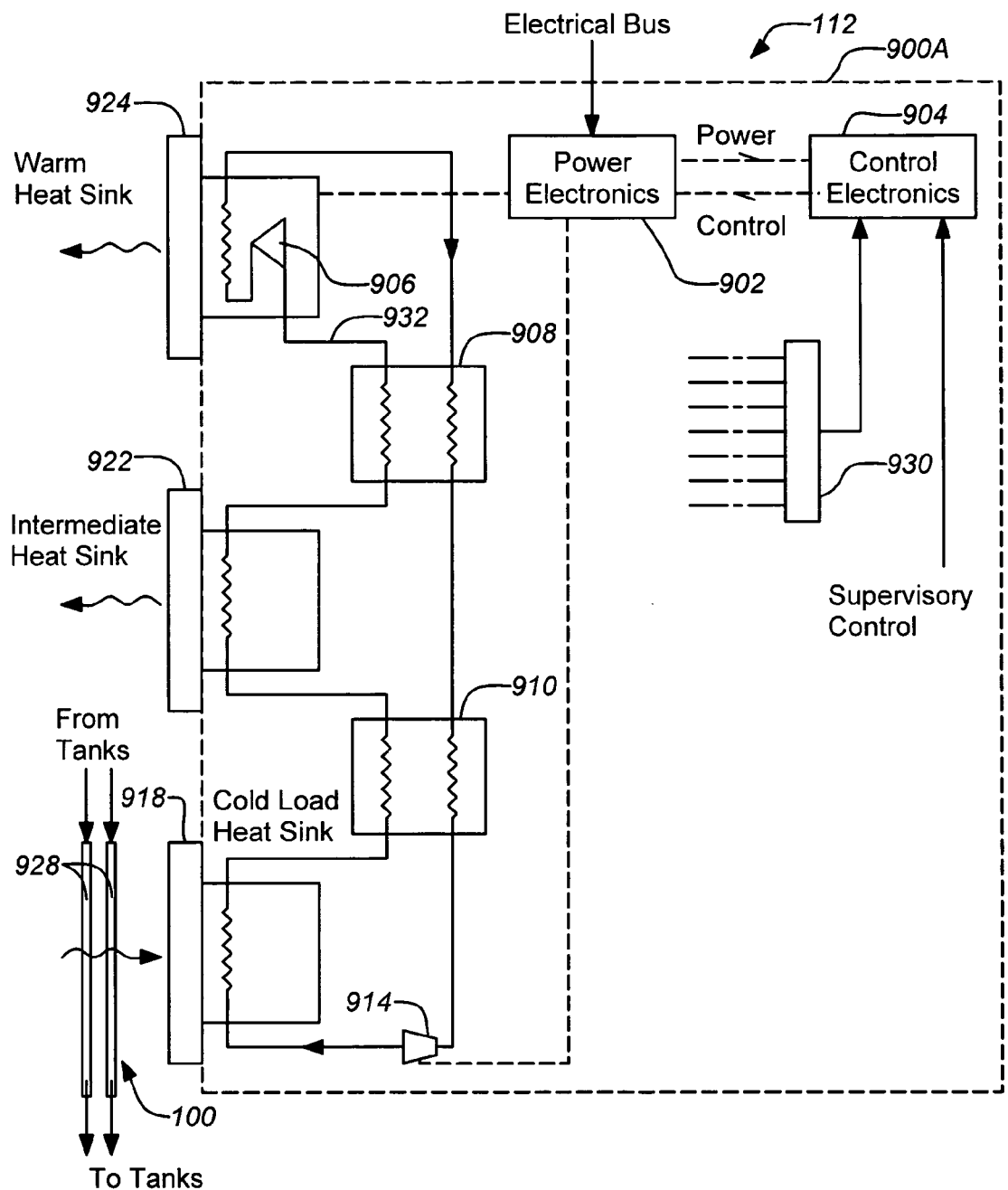
FIG. 9A is schematic diagram of a cryocooler system with single stage cooling operable in an embodiment of the invention.
Figure 9B:
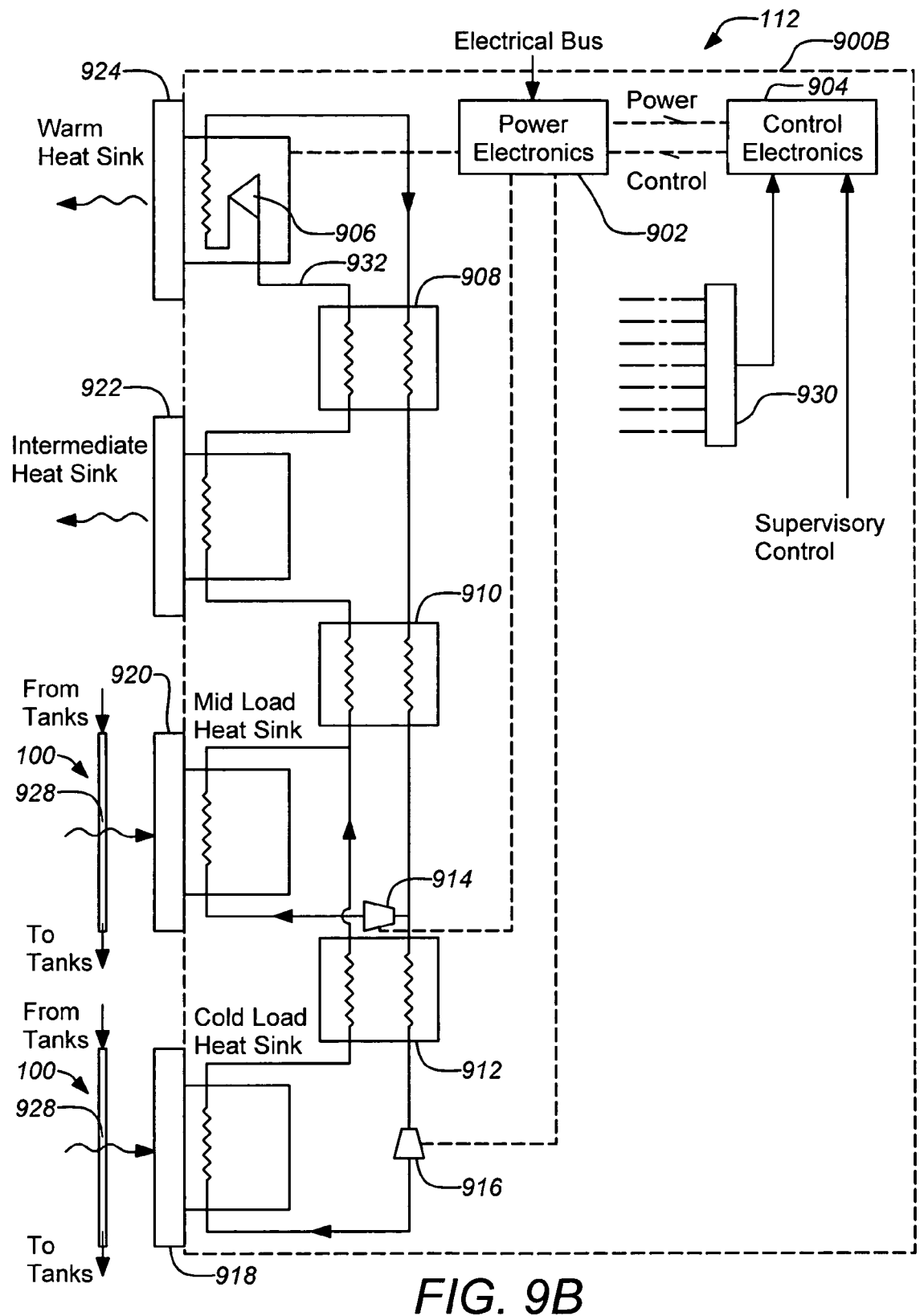
FIG. 9B is schematic diagram of a cryocooler system with two stage cooling operable in an embodiment of the invention.

FIGS. 9A and 9B are schematic diagram of cryocooler systems 900A, 900B operable in an embodiment of the invention. FIG. 9A illustrates a cryocooler system 900A with a single cooling stage and FIG. 9B illustrates a cryocooler system 900B with two cooling stages. In general, the components of the cryocooler 112 include power electronics 902 and control electronics 904, a compressor 906, two or more recuperator heat exchangers 908, 910, 912, one or more expansion turbines 914, 916 and one or more thermal interfaces 918, 920 and a pair of heat rejecting sinks 922, 924. Sensors 930 (e.g. temperature sensors 110) and supervisory control are used as input to the control electronics 904 to regulate the cryocooler 112 through the power electronics 902 (comprising a propellant monitoring and temperature control system 54 as shown in the system block diagram of FIG. 4, for example) coupled to the compressor 906 and turbine(s) 914, 916. The sensors 930 may be disposed on the tanks 114 of the propellant cartridge system 22, 41 to monitor the temperature of the propellant therein; the sensor information is provided to the cryocooler 112 through a coupled interface with the propellant cartridge system 22, 41. See, e.g. FIGS. 2 and 7. Helium may be employed as a working fluid in the cryocooler 112 fed into the centrifugal compressor 906 via small diameter insulated tubing 932.

Referring to the single stage cooling system 900A of FIG. 9A, the high pressure helium is then pre-cooled by the warm heat rejecting sink 924 and then the all-metal counter-flow recuperative heat exchangers 908, 910 before entering the expansion turbine 914. The expansion turbine 914 cools and directs cold helium to the conductive thermal interface 918 at a specified cooling temperature. The one or more propellant lines 100 from the propellant cartridge system 22, 41 through the propellant couplers 98 (e.g., in FIGS. 2 and 7) are disposed proximate to the thermal surface 918 so that the propellant 928 passing through them is cooled before returning to the propellant cartridge system 22, 41. The returning heated helium is passed through the recuperative heat exchanger 910 and then through the intermediate heat rejecting sink 922 to remove the excess heat. Following this, the helium then passes through the remaining recuperative heat exchanger 908 and then returns to the compressor 906. The single stage cooling system 900A is well suited for cooling either a single propellant or a plurality of propellants so long as the all of the propellants require a similar cooling temperature. For example, the known fuel and oxidizer bipropellant combination of methane and oxygen have similar cryogenic temperatures allowing the use of a single stage cooling system 900A for the cryocooler 112.

The two stage cooling system 900B of FIG. 9B operates similar to the system 900A of FIG. 9A. However in this case, the cryocooler 112 comprises a plurality of cooling interfaces to cool the propellant. After the compressor 906 and the warm heat rejecting sink 924, the helium passes through two counter-flow recuperative heat exchangers 908, 910 before flow is divided between a first expansion turbine 914 and also a third counter-flow recuperative heat exchanger 912. The flow from the heat exchanger 912 the enters a second turbine 916. The separate expansion turbines 914, 916 cool and direct cold helium to the conductive thermal interfaces 918, 920 at a specified cooling temperature (typically, a distinct temperature for each interface 918, 920). In this case, separate propellant lines 100 from the propellant cartridge system 22, 41 through the propellant couplers 98 (e.g., in FIGS. 2 and 7) are disposed proximate to the separate thermal surfaces 918, 920 so that the propellant 928 passing through them is cooled before returning to the propellant cartridge system 22, 41. The returning heated helium is passed through the recuperative heat exchangers 912 and/or 910 as shown and then through the intermediate heat rejecting sink 922 to remove the excess heat. Following this, the helium then passes through the remaining recuperative heat exchanger 908 and then returns to the compressor 906. The two stage cooling system 900B is useful for cryogenic cooling of bipropellant combinations where a distinct cooling temperature is required for the fuel and the oxidizer. For example, the known fuel and oxidizer bipropellant combination of hydrogen and oxygen have distinct cryogenic temperatures requiring the use of a two stage cooling system 900A for the cryocooler 112 (or two separate single stage systems). The foregoing cryocooler systems 900A, 900B provide examples of a cryocooler 112 that may be employed in an embodiment of the invention.

It should also be noted that the cryocooler 112 may also employ single stage heat rejection in a manner similar to the single stage cooling as will be understood by those skilled in the art. For example, referring to the either cooling system 900A, 900B, the intermediate heat sink 922 may be eliminated and the two counter-flow recuperative heat exchangers 908, 910 may be combined into a single unit. Thus, the warm heat sink 924 remains as the only heat rejecting sink.

The design details of the cryocooler 112 will depend upon the specific application as will be understood by those skilled in the art. Furthermore, alternate designs for the cryocooler 112 may be employed provided the cryocooler 112 is capable of receiving propellant from a remotely located propellant cartridge system 22, 41, cooling the propellant and then returning the cooled propellant to the propellant cartridge system 22, 41 through a temporarily couplable interface (e.g. propellant couplers 98) including feed and return lines 100 for the propellant.

Figure 10:
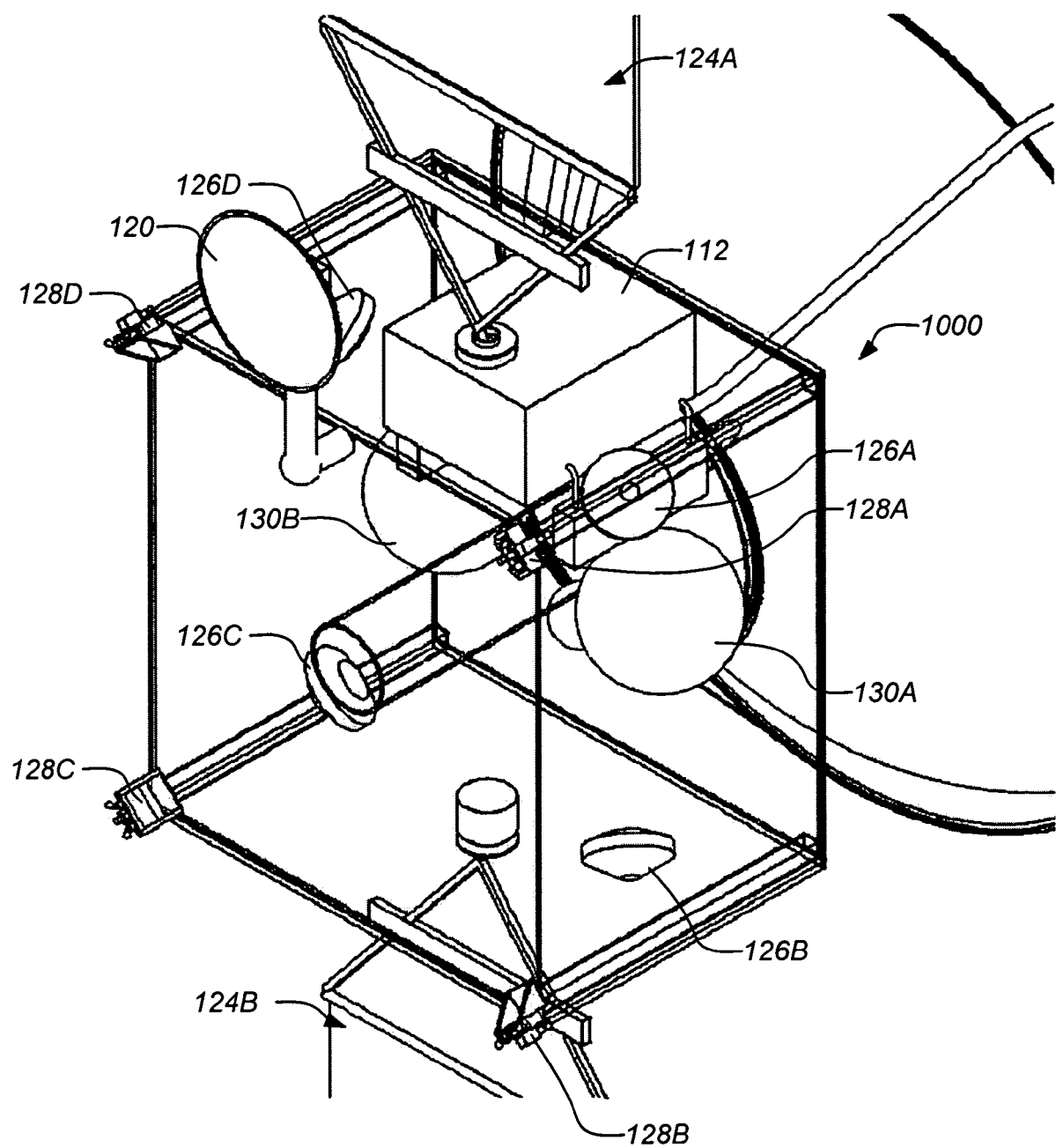
FIG. 10 illustrates a cryocooler location in a spacecraft bus in an embodiment of the invention.

FIG. 10 illustrates a cryocooler 112 located within a spacecraft bus 1000 (e.g. as in a utility box 12, 42 of FIGS. 1-7) in an exemplary embodiment of the invention. For example, the spacecraft bus 1000 may incorporate a plurality of reaction wheel assemblies 126A-126D to assist with inertial stabilization of the spacecraft. And a plurality of thrusters 128A-128D such as reaction control system (RCS) thrusters to maneuver the satellite (e.g. using propellant from the remotely coupled tank module or from on board propellant tanks 130A, 130B). The spacecraft bus 1000 may also typically utilize sun tracking solar panels 124A-124B (partially shown), as part of the electrical supply system 64 of the system block diagram shown in FIG. 4, to provide electrical power to various spacecraft systems. As previously detailed, the bus 1000 may be employed in manned or unmanned spacecraft utilizing a remote cryocooler 112.

Figure 11:
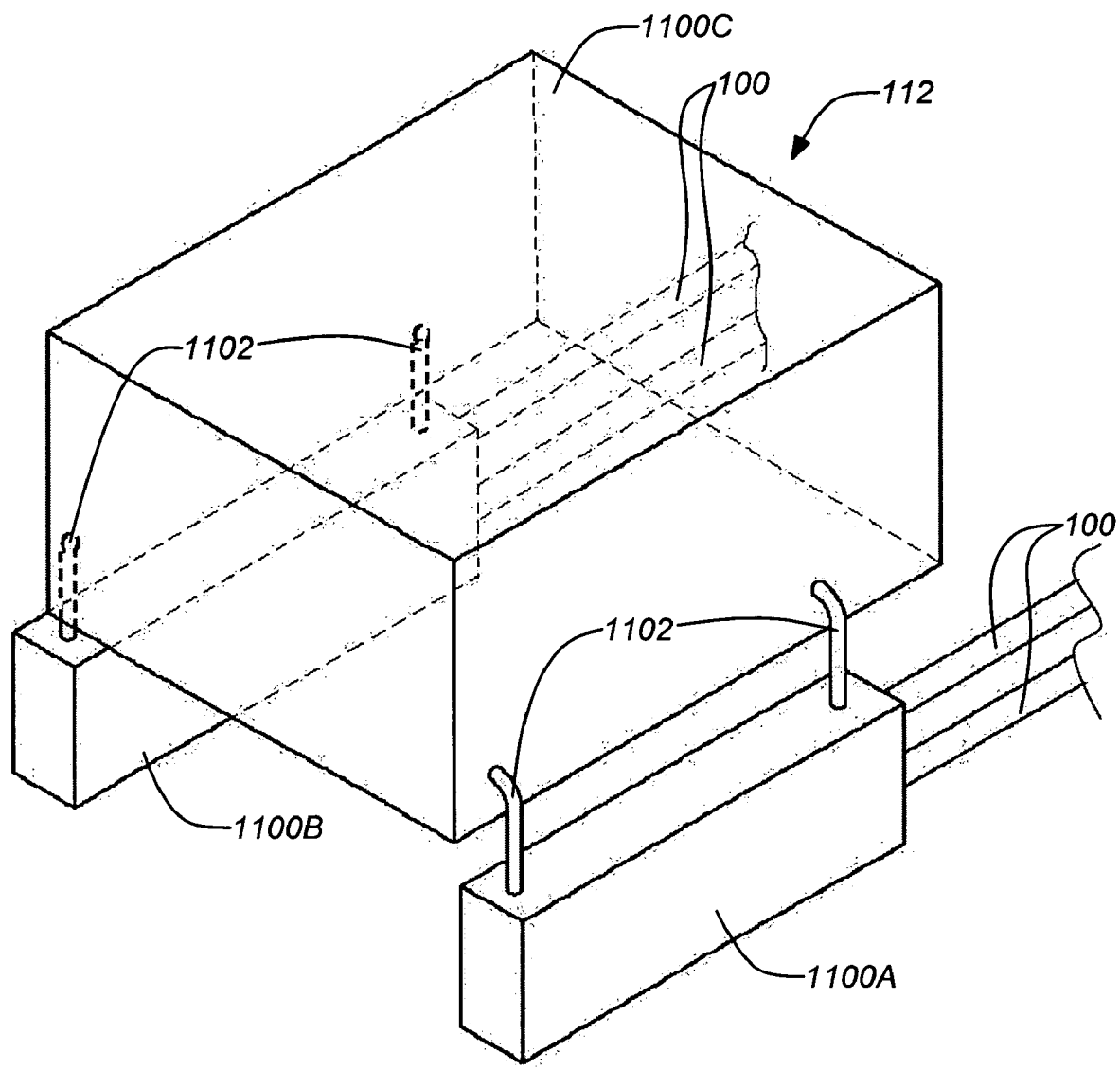
FIG. 11 illustrates insulated lines to and from the cooling interface of the cryocooler.

FIG. 11 illustrates insulated feed and return lines 100 from the cooling interface of the cryocooler 112. As previously described with reference to FIG. 9B, heat from the propellant (fuel and/or oxidizer) in feed and return lines 100 is absorbed by the helium working fluid of the cryocooler 112 pumped through working fluid feed and return lines 1102 to heat exchangers 1100A (comprising the thermal interface 918) and 1100B (comprising the thermal interface 920). In the case of the single stage cooling system 900A of FIG. 9A, the second heat exchanger 1100B is not used. In both cases, the working fluid returned from the one or more heat exchangers 1100A, 1100B through the recuperator heat exchangers 910 and 912 and through the warm radiators (comprising heat sinks 922, 924) shown as an exterior surface 1100C of the cryocooler mounted on the spacecraft bus 1000 as shown in FIG. 10 to reject the heat through radiation. Referring back to FIG. 7, at the interface with the propellant cartridge system 41, propellant couplers 98 on the bus 1000 shown in FIG. 10 are available for feed and return lines 100 of cryogenic fuel and oxidizer. These lines 100 run out the back of the bus 1000 and interface with the tanks 114 of the propellant cartridge system 22, 41. This arrangement allows the cryocooler 112 to be decoupled from the tanks 114 of the propellant cartridge system 22, 41. When the tanks 114 are depleted and ready to be discarded, the cryocooler 112 remains and is ready to thermally manage a new set of tanks 114 when they arrive.

Figure 12:
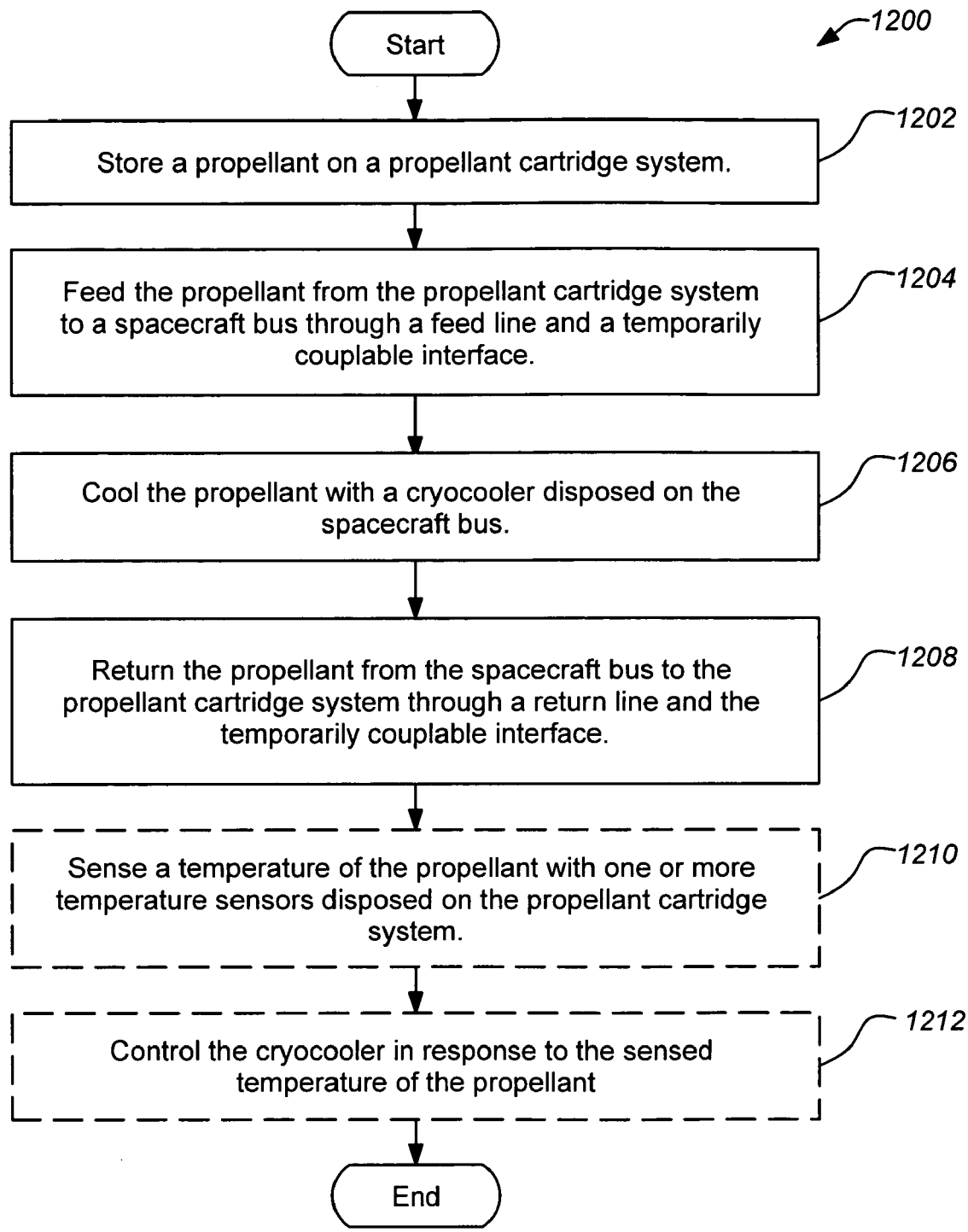
FIG. 12 is a flowchart of an exemplary method of the invention.

FIG. 12 is a flowchart of an exemplary method 1200 of the invention. The method begins with storing propellant on a propellant cartridge system 41 (e.g. shown in FIG. 2) in operation 1202. Next, in operation 1204, the propellant 928 is fed from the propellant cartridge system 41 to a spacecraft bus 1000 (e.g. as shown in FIGS. 9 and 10) through a feed line 100 and a temporarily couplable interface 98 (e.g. as shown in FIG. 7). Following this, the propellant is cooled with a cryocooler 112 (e.g. as shown in FIGS. 9A and 9B) disposed on the spacecraft bus 1000 in operation 1206. Finally, the propellant 928 is returned from the spacecraft bus 1000 to the propellant cartridge system 41 through a return line 100 and the temporarily couplable interface 98 in operation 1208. Typically, the method may also include sensing a temperature of the propellant with one or more temperature sensors 930 disposed on the propellant cartridge system 41 in operation 1210 and controlling the cryocooler 112 in response to the sensed temperature of the propellant 928 in operation 1212 as a closed loop process for controlling the propellant temperature. The method 1200 may be further modified consistent with the apparatus embodiments previously described.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for cooling propellant, comprising:
a cryocooler for cooling a propellant, the cryocooler disposed on a spacecraft bus; and
feed and return lines for carrying the propellant between the spacecraft bus and a propellant cartridge;
wherein the feed and return lines are temporarily couplable through an interface between the spacecraft bus and the propellant cartridge and the propellant cartridge system stores the propellant.

2. The apparatus of claim 1, wherein the spacecraft bus comprises a space depot for spacecraft resupply.

3. The apparatus of claim 1, wherein the spacecraft bus is configured for manned operation.

4. The apparatus of claim 1, wherein the spacecraft bus is configured for unmanned operation.

5. The apparatus of claim 1, wherein the propellant cartridge system is disposable.

6. The apparatus of claim 1, wherein the propellant comprises a fuel and an oxidizer and the propellant cartridge system comprises separate tanks for the fuel and for the oxidizer.

7. The apparatus of claim 1, wherein one or more temperature sensors are disposed on the propellant cartridge system and coupled to a propellant monitoring and temperature control system for the cryocooler.

8. The apparatus of claim 1, wherein the cryocooler comprises a helium working fluid to cool the propellant.

9. The apparatus of claim 1, wherein the cryocooler comprises a plurality of heat rejecting sinks to remove heat from the propellant from the spacecraft bus.

10. The apparatus of claim 1, wherein the cryocooler comprises a plurality of cooling interfaces to cool the propellant.

11. The apparatus of claim 10, wherein the propellant comprises a fuel and oxidizer and each of the plurality of cooling interfaces separately cools the fuel and the oxidizer.

12. A method of cooling propellant, comprising the steps of:
storing propellant on a propellant cartridge system;
feeding propellant from the propellant cartridge system to a spacecraft bus through a feed line and a temporarily couplable interface;
cooling the propellant with a cryocooler disposed on the spacecraft bus; and
returning the propellant from the spacecraft bus to the propellant cartridge system through a return line and the temporarily couplable interface.

13. The method of claim 12, wherein the spacecraft bus comprises a space depot for spacecraft resupply.

14. The method of claim 12, wherein the spacecraft bus is configured for manned operation.

15. The method of claim 12, wherein the spacecraft bus is configured for unmanned operation.

16. The method of claim 12, wherein the propellant cartridge system is disposable.

17. The method of claim 12, wherein the propellant comprises a fuel and an oxidizer and the propellant cartridge system comprises separate tanks for the fuel and for the oxidizer.

18. The method of claim 12, further comprising sensing a temperature of the propellant with one or more temperature sensors disposed on the propellant cartridge system; and
controlling the cryocooler in response to the sensed temperature of the propellant.

19. The method of claim 12, wherein the cryocooler comprises a helium working fluid to cool the propellant.

20. The method of claim 12, wherein the cryocooler comprises a plurality of heat rejecting sinks to remove heat from the propellant from the spacecraft bus.

21. The method of claim 12, wherein the cryocooler comprises a plurality of cooling interfaces to cool the propellant.

22. The method of claim 21, wherein the propellant comprises a fuel and oxidizer and each of the plurality of cooling interfaces separately cools the fuel and the oxidizer.

* * * * *